United States Patent
Muramatsu et al.

(10) Patent No.: US 6,491,556 B2
(45) Date of Patent: Dec. 10, 2002

(54) VENTILATION SYSTEM FOR WATERCRAFT ENGINE

(75) Inventors: Hitoshi Muramatsu, Shizuoka (JP); Noboru Suganuma, Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/960,573

(22) Filed: Sep. 20, 2001

(65) Prior Publication Data

US 2002/0081919 A1 Jun. 27, 2002

(30) Foreign Application Priority Data

Sep. 20, 2000 (JP) .................................... 2000-284753
Apr. 6, 2001 (JP) .................................... 2001-108382

(51) Int. Cl.[7] .............................................. B63H 21/10
(52) U.S. Cl. .................................... 440/88; 123/196 R
(58) Field of Search ................ 440/88, 89; 123/196 A, 123/196 R, 196 S

(56) References Cited

U.S. PATENT DOCUMENTS

| | | | |
|---|---|---|---|
| 4,414,929 A | * 11/1983 | Sakurai | 123/196 R |
| 4,637,355 A | * 1/1987 | Odashima | 123/196 A |
| 4,697,553 A | * 10/1987 | Lie | 123/196 R |
| 5,149,287 A | * 9/1992 | Koike | 440/88 |
| 5,167,207 A | * 12/1992 | Gohara et al. | 123/196 R |
| 5,195,481 A | * 3/1993 | Oyama et al. | 123/196 R |
| 5,558,549 A | 9/1996 | Nakase et al. | 440/88 |
| 5,640,936 A | * 6/1997 | Hudson | 123/196 A |
| 5,839,930 A | 11/1998 | Nanami et al. | 440/88 |
| 5,899,186 A | * 5/1999 | Kawamoto | 123/196 R |
| 5,951,343 A | 9/1999 | Nanami et al. | 440/88 |
| 5,997,372 A | * 12/1999 | Idzikowski et al. | 440/88 |
| 6,029,638 A | 2/2000 | Funai et al. | 123/572 |
| 6,015,320 A | 6/2000 | Nanami | 440/88 |

OTHER PUBLICATIONS

Co–pending application Ser. No.: 09/157,076, filed Sep. 18, 1998, in the name of Nanami et al., entitled Four Cycle Lubricating System for Watercraft and assigned to Yamaha Hatsudoki Kabushiki Kaisha.

Co–pending application Ser. No.: 09/291,027 filed Apr. 13, 1999, in the name of Toshiyuki Hattori, entitled Cooled Oil Reservoir for Watercraft and assigned to Yamaha Hatsudoki Kabushiki Kaisha.

Co–pending application Ser. No.: 09/775,354, filed Jan. 31, 2001, in the name of Suganuma et al., entitled Lubrication System for 4–Cycle Engine of Small Watercraft and assigned to Sanshin Kogyo Kabushiki Kaisha.

Co–pending application Ser. No.: 09/815,421, filed Mar. 22, 2001, in the name of Suganuma et al., entitled Oil Pump Construction for Watercraft Engine and assigned to Sanshin Kogyo Kabushiki Kaisha.

Ser. No.: 09/929,458, filed Aug. 13, 2001, in the name of Noboru Suganuma, entitled Oil Pump Unit for Engine and assigned to Sanshin Kogyo Kabushiki Kaisha.

* cited by examiner

*Primary Examiner*—S. Joseph Morano
*Assistant Examiner*—Lars A. Olson
(74) *Attorney, Agent, or Firm*—Knobbe, Martens, Olson & Bear, LLP

(57) ABSTRACT

A ventilation system for a watercraft engine includes an improved construction that can inhibit oil in an oil container from flowing into an air induction system even if the watercraft capsizes. The engine includes an engine body and an air induction system that introduces air to combustion chambers. A lubrication system is arranged to lubricate at least a portion of the engine body with lubricant oil. The lubrication system includes an oil tank assembly out of the engine body. A ventilation system is arranged to separate a gaseous component from a liquid component. The ventilation system includes a separator configured to separate the gaseous component from the liquid component. A ventilation passage connects the separator with the air induction system. A return passage couples a bottom portion of the ventilation passage with inside of the engine body.

40 Claims, 12 Drawing Sheets

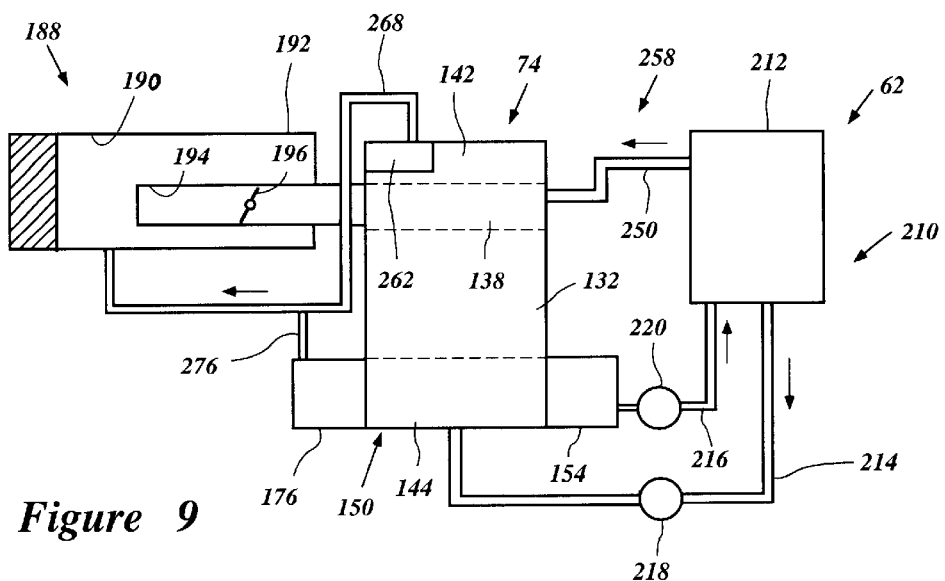
Figure 9
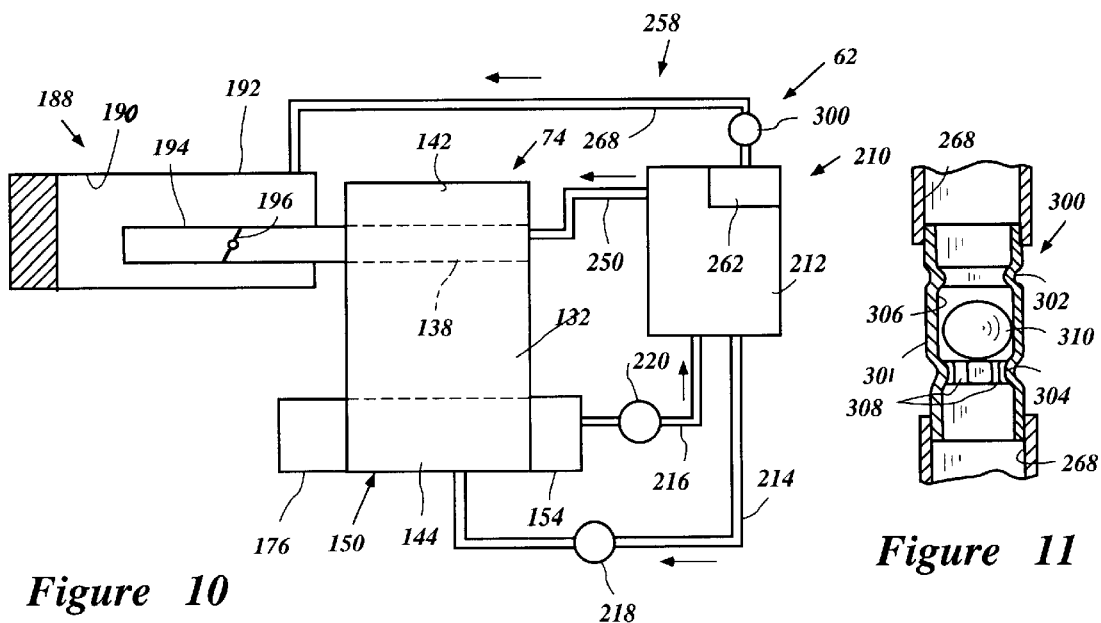
Figure 10
Figure 11

VENTILATION SYSTEM FOR WATERCRAFT ENGINE

PRIORITY INFORMATION

This application is based on and claims priority to Japanese Patent Applications No. 2000-284753, filed Sep. 20, 2000, No. 2001-108382, filed Apr. 6, 2001 and No. 2001-276355, filed Sep. 12, 2001, the entire contents of which are hereby expressly incorporated by reference.

BACKGROUND OF THE INVENTION

1. Field of the Invention

The present invention relates generally to an ventilation system for a watercraft engine, and more particularly to an improved induction system which includes a vapor return system.

2. Description of Related Art

Personal watercraft have become very popular in recent years. This type of watercraft is quite sporting in nature and carries one or more riders. A relatively small hull of the personal watercraft defines a rider's area above an engine compartment. An internal combustion engine powers a jet propulsion unit which propels the watercraft. The engine lies within the engine compartment in front of a tunnel formed on the underside of the hull. A jet propulsion unit, which includes an impeller, is placed within the tunnel. The impeller has an impeller shaft driven by the engine. The impeller shaft extends between the engine and the jet propulsion device through a bulkhead of the hull tunnel.

Typically, two-cycle engines are used in personal watercraft because two-cycle engines have a fairly high power to weight ratio. One disadvantage of two-cycle engines, however, is that they produce relatively high emissions. In particular, large amounts of carbon monoxide and hydrocarbons are produced during operation of the engine. When steps are taken to reduce these emissions, other undesirable consequences typically result, such as an increase in weight of the engine, the cost of manufacture, and/or the reduction of power.

It has been suggested that four-cycle engines replace two-cycle engines in personal watercraft. Four-cycle engines typically produce less hydrocarbon emissions an two-cycle engines while still producing a relatively high power output. However, adapting four-cycle engines for use in personal watercraft has its own engineering and technical challenges due to, at least in part, the limited space available within the hull of a personal watercraft.

A four-cycle engine utilizes a more complex lubrication system as compared with a two-cycle engine. One approach to enabling the use of a four-cycle engine in personal watercraft applications is to provide the engine with a dry sump lubrication system. A dry sump system utilizes a shallow reservoir of oil available for an oil pump as compared with the volume of oil in a wet sump system having an oil pan, thus reducing the overall height of the engine.

A four-cycle engine can also utilize a ventilation system through which blow-by gases are returned to an air induction system to be burned with an air/fuel charge in one or more combustion chambers. The blow-by gases are comprised of air/fuel mixture and/or oil leaking from a combustion chamber into the crankcase through a nominal space formed between a piston and an inner surface of a cylinder bore.

FIG. 1 illustrates a diagrammatic view of an exemplary arrangement that includes a combined lubrication and ventilation system. It should be noted that the arrangement shown in FIG. 1 is not prior art and was developed by the inventors themselves. While the engine 28 is operating, lubricant oil that has lubricated engine portions and blow-by gases together drain downwardly to a shallow reservoir defined in the crankcase 30 of the engine 28. A scavenge pump 32 pressurizes the oil and the blow-by gases to an oil tank assembly 34 through a scavenge passage 36. A feed pump 38 pressurizes and thereby feeds the oil in the oil tank assembly 34 to the engine portions that need lubrication through a feed passage 40. If the oil in the oil tank assembly 34 exceeds a preset level, the excess oil moves to a cylinder head 42 through a spillway passage 44 and thus lubricates engine components therein.

A plenum chamber 46 is coupled with the combustion chamber defined within the cylinder head 42 through an intake passage. The blow-by gases collected in the oil tank assembly 34 are drawn into the plenum chamber 46 through a ventilation passage 50 and then to the combustion chamber with a fresh air/fuel charge to be burned therein. This cycle repeats as the engine 28 operates.

SUMMARY OF THE INVENTION

One aspect of the present invention includes the realization that the arrangement illustrated in FIG. 1 can cause a problem if used with a personal watercraft. Typically, personal watercraft are capsized and readily returned to a normal upright position during operation. However, in the arrangement thus described, the oil in the oil tank assembly 34 can flow into the ventilation passage 50 and then to the plenum chamber 46 while the watercraft capsizing. If this occurs, an air induction system including the plenum chamber 46 and the intake passage 48 can be damaged by the oil flown thereinto. Additionally, such a flow of oil into the induction system can interfere with normal operation of the engine. A need thus exists for an improved ventilation system for a watercraft engine that can inhibit the oil from flowing into an air induction system even if the watercraft capsizes.

In accordance with another aspect of the present invention, a watercraft comprises a hull. A propulsion device is configured to propel the hull. An internal combustion engine is configured to power the propulsion device. The engine includes an engine body and a moveable member moveable relative to the engine body. The engine body and the moveable member together define a combustion chamber. An air induction system is configured to guide air to the combustion chamber. A lubrication system is arranged to lubricate at least a portion of the engine body with lubricant oil. The lubrication system includes an oil container out of the engine body. A ventilation system is configured to separate a gaseous component from a liquid component. The ventilation system includes a separator configured to separate the gaseous component from the liquid component. A ventilation passage connects the separator with the air induction system. A return passage couples a bottom portion of the ventilation passage with inside of the engine body.

In accordance with yet another aspect of the present invention, a watercraft comprises a hull. A propulsion device is arranged to propel the hull. An internal combustion engine is arranged to power the propulsion device. The engine includes an engine body and a moveable member moveable relative to the engine body. The engine body and the moveable member together define a combustion chamber. An air induction system is arranged to introduce air to the combustion chamber. A lubrication system is arranged to lubricate at least a portion of the engine body with lubricant oil. The lubrication system includes an oil container out of the engine body. A ventilation system is arranged to separate a gaseous component from a liquid component. The ventilation system includes a separator configured to separate the gaseous component from the liquid component. A ventilation passage connects the separator with the air induction system. An upstream end of the ventilation passages is disposed on one side of the hull. At least a portion of the ventilation passage is disposed on the other side of the hull.

In accordance with a further aspect of the present invention, a watercraft comprises a hull. A propulsion device is arranged to propel the hull. An internal combustion engine is arranged to power the propulsion device. The engine includes an engine body and a moveable member moveable relative to the engine body. The engine body and the moveable member together define a combustion chamber. An air induction system is arranged to introduce air to the combustion chamber. A lubrication system is arranged to lubricate at least a portion of the engine body with lubricant oil. The lubrication system includes an oil container out of the engine body. A ventilation system is arranged to separate a gaseous component from a liquid component. The ventilation system includes a separator configured to separate the gaseous component from the liquid component. A ventilation passage connects the separator with the air induction system. A check valve is disposed within the ventilation passage. The check valve is configured to open when the watercraft is in a normal upright position and to close when the watercraft is in a capsizing position.

In accordance with a still further aspect of the present invention, a watercraft comprises a hull. A propulsion device is configured to propel the hull. An internal combustion engine is configured to power the propulsion device. The engine includes an engine body and a moveable member moveable relative to the engine body. The engine body and the moveable member together define a combustion chamber. An air induction system is configured to guide air to the combustion chamber. A lubrication system is configured to lubricate at least a portion of the engine body with lubricant oil. The engine body defines a space in which the oil that has lubricated the portion of the engine body temporarily collects. The lubrication system includes an oil container out of the engine body. A scavenge passage couples the space with the oil container. A ventilation system is configured to separate a gaseous component from a liquid component. The ventilation system includes a separator configured to separate the gaseous component from the liquid component. A ventilation passage connects the separator with the air induction system. A return passage couples the ventilation passage with inside of the engine body. The return passage is connected with the scavenge passage.

In accordance with a yet further aspect of the present invention, a watercraft comprises a hull. A propulsion device is configured to propel the hull. An internal combustion engine is configured to power the propulsion device. The engine includes an engine body and a moveable member moveable relative to the engine body. The engine body and the moveable member together define a combustion chamber. An air induction system is configured to introduce air to the combustion chamber. A lubrication system is configured to lubricate at least a portion of the engine body with lubricant oil. The lubrication system includes an oil container out of the engine body. A ventilation system is configured to separate a gaseous component from a liquid component. The ventilation system includes a plurality of separators configured to separate the gaseous component from the liquid component. A ventilation passage connects the separators with the air induction system. A return passage couples the ventilation passage with inside of the engine body.

BRIEF DESCRIPTION OF THE DRAWINGS

These and other features, aspects and advantages of the present invention will now be described with reference to the drawings of preferred embodiments, which embodiments are intended to illustrate and not to limit the present invention. The drawings comprise include 17 figures.

As noted above,

FIG. 9 is a schematic view of another modification of the combined lubrication and ventilation system shown in FIG. 6.

FIG. 10 is a schematic view of yet another modification of the combined lubrication and ventilation system shown in FIG. 6.

FIG. 11 is a cross-sectional view of an exemplary check valve utilized in the combined lubrication and ventilation system illustrated in FIG. 10.

DETAILED DESCRIPTION OF THE PREFERRED EMBODIMENTS OF THE INVENTION

Figure 1:
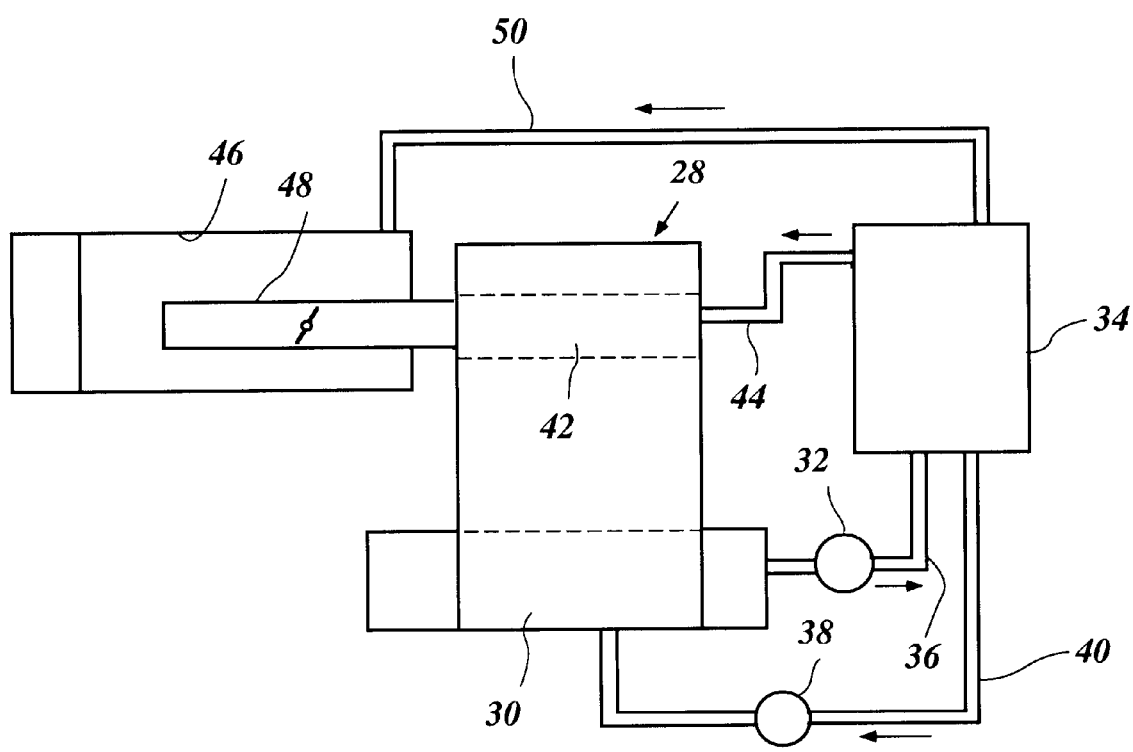
FIG. 1 illustrates a diagrammatic view of an exemplary arrangement of a combined lubrication and ventilation system.
Figure 2:
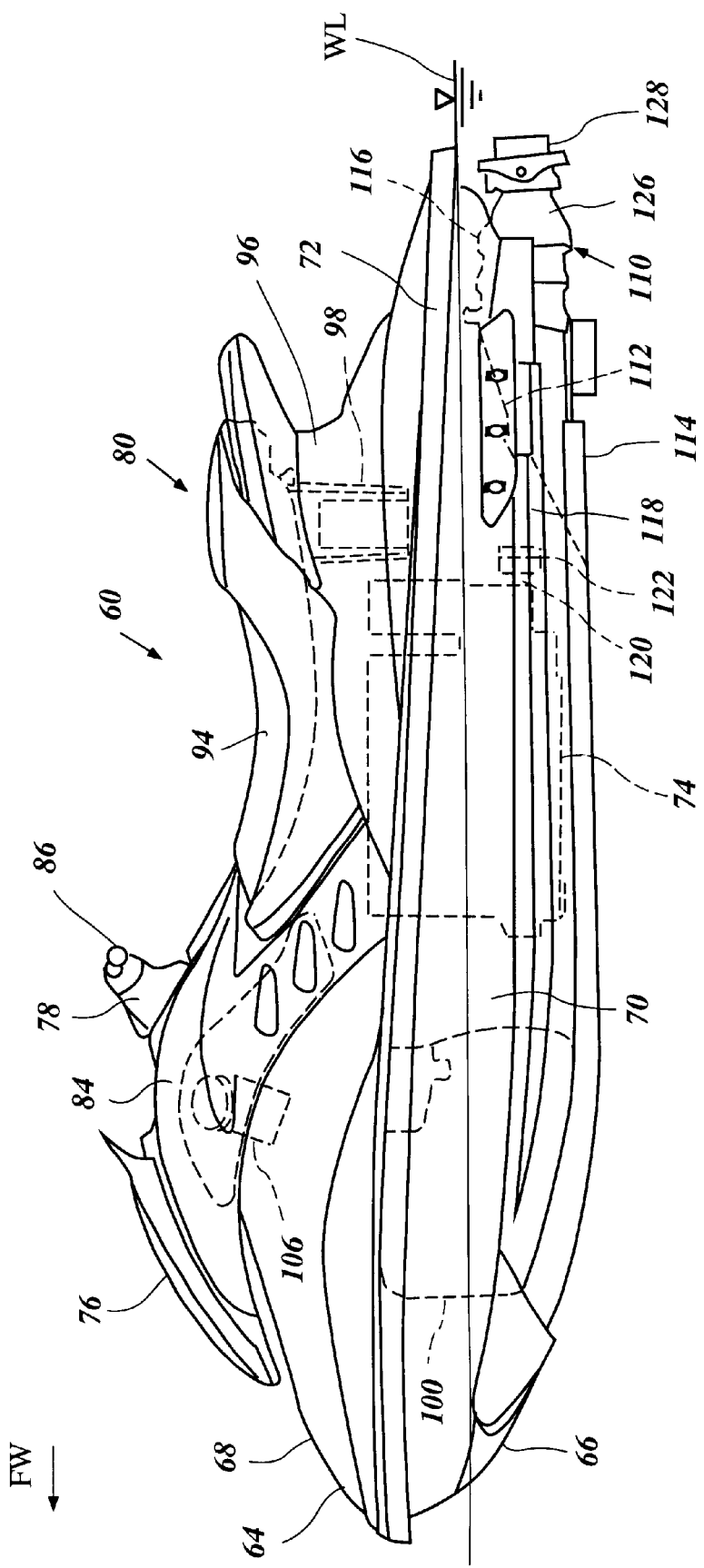
FIG. 2 is a side elevational view of a personal watercraft of the type powered by an engine configured in accordance with a preferred embodiment of the present invention. Several of the material components of the watercraft (e.g., the engine) are illustrated in phantom.

With primary reference to FIGS. 2–5, and additionally to FIG. 6, an overall construction of a watercraft 60 that employs a combined lubrication and ventilation system 62 arranged in accordance with certain features, aspects and advantages of the present invention will be described. The combined lubrication and ventilation system 62 has particular utility in the context of a personal watercraft and thus is described in the context of a personal watercraft. The combined system, however, can be applied to other types of recreational vehicles as well, such as, for example, small jet boats, all-terrain vehicles and the like.

The watercraft 60 and part of the combined lubrication and ventilation system 62 are generally disclosed in co-pending U.S. applications filed Mar. 22, 2000, titled OIL PUMP CONSTRUCTION FOR WATERCRAFT ENGINE, U.S. patent application Ser. No. 09/815421 (Attorney's docket number FS.16692US0A), and filed Jul. 12, 2000, titled OIL PUMP UNIT FOR ENGINE, U.S. patent application Ser. No. 09/929458 (Attorney's docket number FS.16960US0A), the entire contents of both are hereby expressly incorporated by reference.

The personal watercraft 60 includes a hull 64 generally formed with a lower hull section 66 and an upper hull section or deck 68. The lower hull section 66 is generally configured as a V-shape. Both the hull sections 66, 68 are made of, for example, a molded fiberglass reinforced resin or a sheet molding compound. The lower hull section 66 and the upper hull section 68 are coupled together to define an internal cavity including an engine compartment 70. An intersection of the hull sections 66, 68 is defined in part along an outer surface gunnel or bulwark 72. The hull 64 houses an internal combustion engine 74 that powers the watercraft 60.

Figure 3:
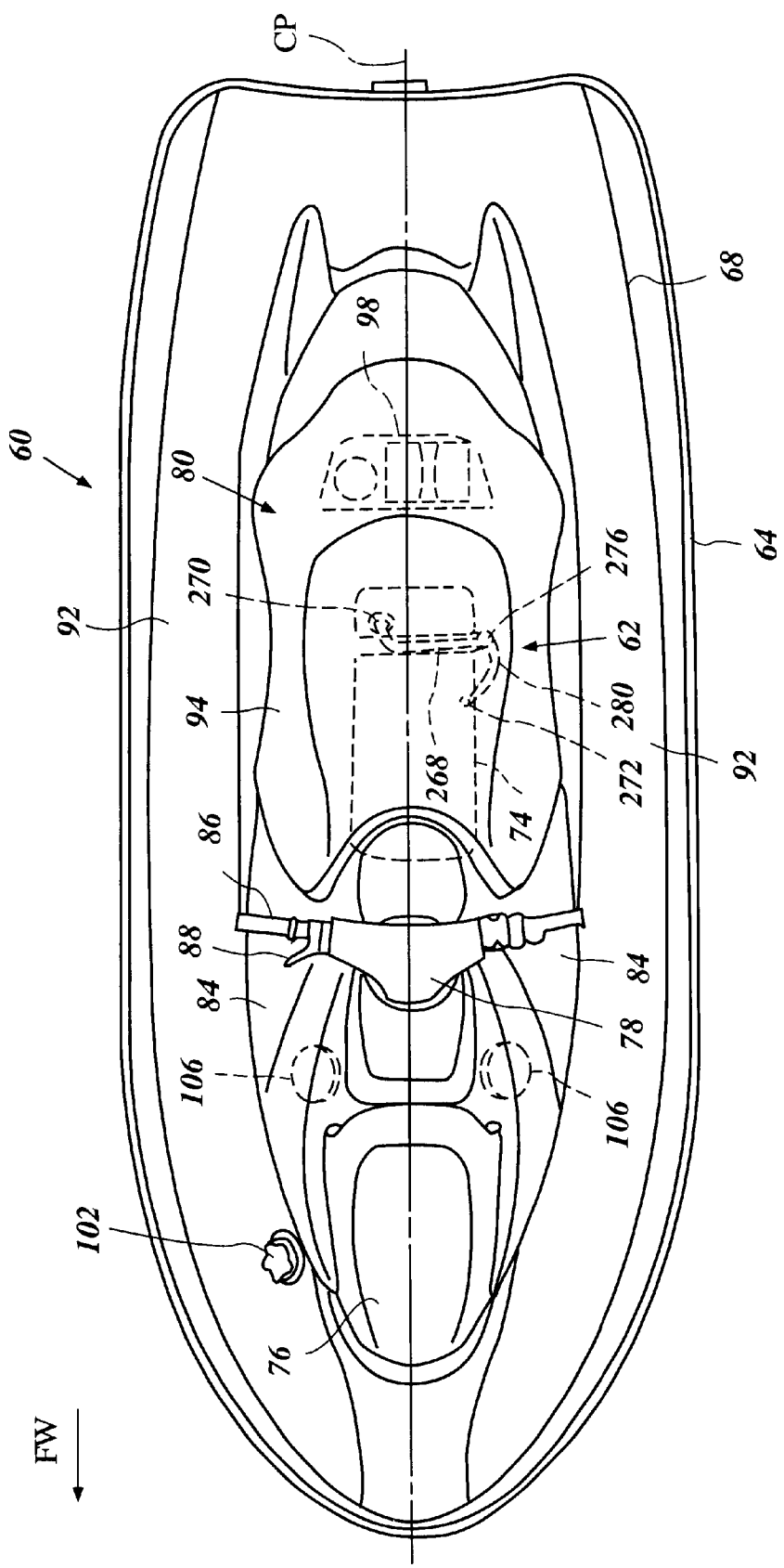
FIG. 3 is a top plan view of the watercraft illustrated in FIG. 2.
Figure 4:
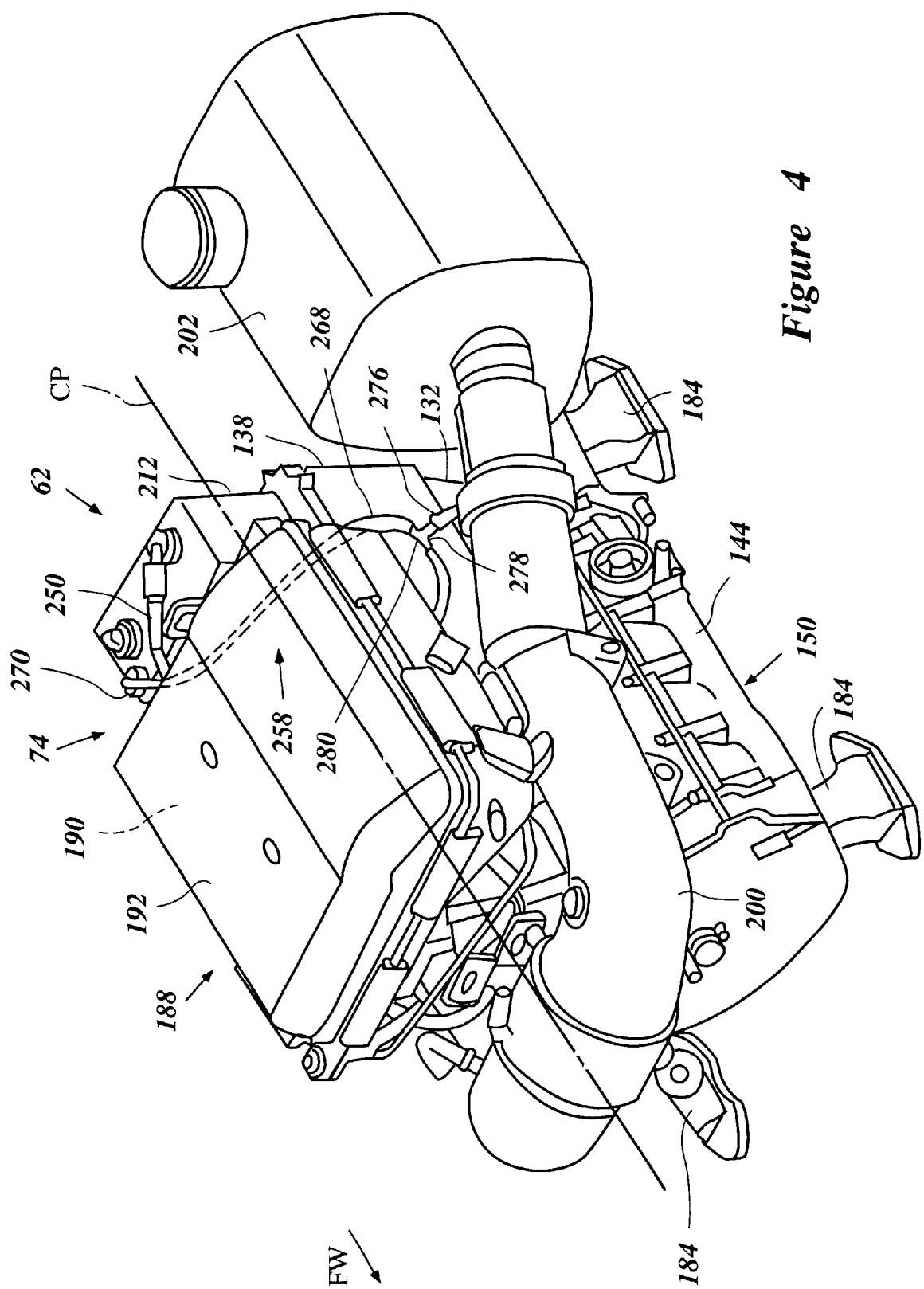
FIG. 4 is a top, front, and port side perspective view of an engine with a plenum chamber, exhaust conduits, and an oil tank assembly that are employed by the watercraft illustrated in FIG. 2.

As shown in FIGS. 3 and 4, the hull 64 defines a center plane CP that extends generally vertically from bow to stern along the longitudinal centerline of the watercraft 60 when it is resting in a normal upright position. The symbol "FW" of FIGS. 2–5 indicates the forward direction of the watercraft 60 and the symbol "WL" of FIG. 2 indicates the water line. Along the center plane CP, the upper hull section 68 includes a hatch cover 76, a steering mast 78, and a seat 80 one after another from fore to aft.

A bow portion 84 of the upper hull section 68 slopes upwardly and an opening (not shown) is provided through which a rider can conveniently access a front portion of the engine compartment 70. The bow portion 84 preferably is formed with a pair of separate cover member pieces. The hatch cover 76 is hinged to open or is detachably affixed to the bow portion 84 to cover the opening.

The steering mast 78 extends generally upwardly toward the top of the bow portion 84 to support a handle bar 86. The handle bar 86 is provided primarily to steer the watercraft 60. The handle bar 86 also carries control devices such as, for example, a throttle lever 88 (FIG. 3) for controlling the engine 74.

The seat 80 extends from fore to aft along the center plane CP at a location behind the steering mast 78. The seat 80 is configured generally with a saddle-shape so that the rider can straddle the seat 80. Foot areas 92 (FIG. 3) are defined on both sides of the seat 80 and on an upper surface of the upper hull section 68. The foot areas 92 are generally flat. However, the foot areas 92 preferably slopes upwardly toward the aft of the watercraft 60.

A seat cushion 94 has a rigid backing and is supported by a pedestal section 96 of the upper hull section 68 and thus forms a portion of the seat 80. The pedestal section 96 forms the other portion of the seat 80. The seat cushion 94 is detachably affixed to the pedestal section 96. An access opening is defined on the top surface of the pedestal section 96, under the seat cushion 94, through which the rider can conveniently access a rear portion of the internal cavity 70. The seat cushion 94 usually closes the access opening.

The upper hull section 68 also defines a storage box 98 under the seat 80. The storage box 98 preferably is made from a removable container. Optionally, the watercraft 60 can include one or more bulkheads (not shown) which divide the engine compartment 70 into an engine compartment and at least one other internal compartment (not shown).

A fuel tank 100 is placed in the internal cavity 70 under the bow portion 84 of the upper hull section 68. The fuel tank 100 is coupled with a fuel inlet port (not shown) positioned atop the upper hull section 68 through a fuel duct. A closure cap 102 (FIG. 3) closes the fuel inlet port. Optionally, the closure cap 102 can be disposed under the hatch cover 76.

A pair of air ducts or ventilation ducts 106 is provided on both sides of the bow portion 84 so that the ambient air can enter the internal cavity 70 through the ducts 106. Optionally, the watercraft 60 can also include other ducts (not shown) for guiding air into in the engine compartment 70, or other compartments. Except for the air ducts 106, the internal cavity 70 is substantially sealed to protect the engine 74, a fuel supply system including the fuel tank 100 and other systems or components from water.

The engine 74 preferably is placed within the engine compartment 70 and generally under the seat 80, although other locations are also possible (e.g., beneath the steering mast 78 or in the bow). The rider can access the engine 74 through the access opening by detaching the seat cushion 94 from the pedestal section 96.

Figure 5:
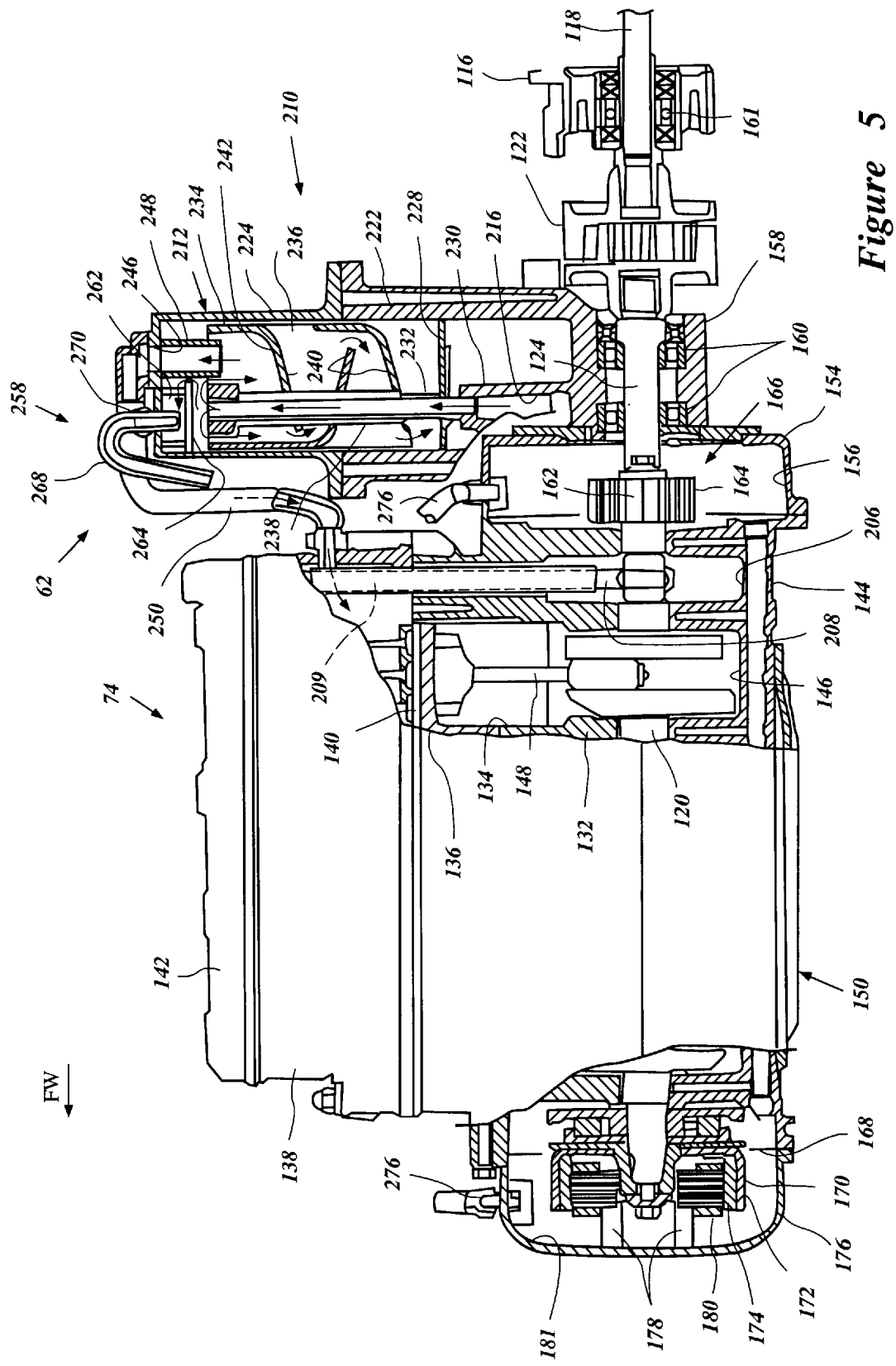
FIG. 5 is a partial port side elevational and cross-sectional view of the engine shown in FIG. 4 showing the oil tank assembly towards a rear end thereof.

A jet pump assembly 110 propels the watercraft 60. The jet pump assembly 110 is mounted in a tunnel 112 formed on the underside of the lower hull section 66. Optionally, a bulkhead can be disposed between the tunnel 112 and the engine 74. The tunnel 112 has a downward facing inlet opening 114 opening toward the body of water. An impeller housing 116 is disposed within a portion of the tunnel 112 and communicates with the inlet opening 114. An impeller is journaled within the impeller housing 116. An shaft 118 extends forwardly from the impeller and is coupled with a crankshaft or output shaft 120 of the engine 74 by a vibration isolation coupling member 122. The shaft 118 and the crankshaft 120 preferably are connected with each other through an intermediate shaft 124 (FIG. 5). An actual coupling construction is described below with reference to FIG. 5.

A rear end of the impeller housing 116 defines a discharge nozzle 126. A deflector or steering nozzle 128 is affixed to the discharge nozzle 126 for pivotal movement about a steering axis which extends generally vertically. A cable connects the deflector 128 with the steering mast 78 so that the rider can steer the deflector 128, and thereby change the direction of travel of the watercraft 60.

When the crankshaft 120 of the engine 74 drives the shaft 118 and thus the impeller, water is drawn from the surrounding body of water through the inlet port 114. The pressure generated in the housing 116 by the impeller produces a jet of water that is discharged through the discharge nozzle 126 and the deflector 128. The water jet thus produces thrust to propel the watercraft 60. The rider can steer the deflector 128 with the handle bar 86 of the steering mast 78 to turn the watercraft 60 in either right or left direction.

With reference to FIGS. 4 and 5, the engine 74 preferably operates on a four-cycle combustion principle. The engine 74 comprises a cylinder block 132 that preferably defines four cylinder bores 134 spaced apart from each other from fore to aft along the center plane CP. The engine 74 thus is a L4 (in-line four cylinder) type.

Moveable members such as pistons 136 are reciprocally disposed within the cylinder bores 134. At least one cylinder head member 138 is affixed to the upper end of the cylinder block 132 to close respective upper ends of the cylinder bores 134 and defines combustion chambers 140 with the cylinder bores 134 and the respective pistons 136. Separate cylinder head members for each cylinder bore also can be used.

A cylinder cover member 142 covers a top portion of the cylinder head member 138. A crankcase member 144 also is affixed to the lower end of the cylinder block 132 to close the respective lower ends of the cylinder bores 134 and to define a crankcase chamber 146 with the cylinder block 132. The crankshaft 120 is journaled for rotation on bearings within the crankcase chamber 146 and is rotatably connected to the pistons 136 through connecting rods 148. The cylinder block 132, the cylinder head member 138 and the crankcase member 144 preferably are made of aluminum alloy and together define an engine body 150.

The illustrated four-cycle engine merely exemplifies one type of engine on which various aspects and features of the present invention can be used. Other types of engines having other number of cylinders including a single cylinder, and having other cylinder arrangements (V and W type) and other cylinder orientations (e.g., upright and inclined cylinder banks) are all practicable.

With reference to FIG. 5, a gear housing member 154 is affixed to a rear end of the cylinder block 132 and the crankcase member 144 to define a gear chamber 156 therein. An intermediate shaft and pump housing member 158 is affixed to the gear housing member 154 generally on a rear side thereof. The shaft housing member 158 journals the intermediate shaft 124 with at least two bearings 160. The intermediate shaft 124 extends rearwardly and is coupled with the shaft 118 via the coupling member 122. The impeller housing 116 journals the shaft 118 with at least two bearings 161. An axis extending through the intermediate shaft 124 and the shaft 118 is offset from an axis extending through the crankshaft 120 in a horizontal plane which includes both the axes.

A drive gear 162 is mounted on a rear portion of the crankshaft 120. A driven gear or reduction gear 164 is provided at a forward end of the intermediate shaft 124. The drive gear 162 is smaller than the driven gear 164 and thus, a gear reduction pair 166 is formed. The drive and driven gears 162, 164 engage with each other in the gear chamber 156. Aside and opposite to the driven gear 164, a pump gear for driving a pump assembly, described below, also is disposed. With the pump gear, the gear reduction pair 166 forms a gear train. The crankshaft 120 of the engine 74 thus drives the shaft 118 through the intermediate shaft 124 at an angular speed which is less than angular speed of the crankshaft 120 by an amount determined by the gear reduction pair 166.

Forward ends of the cylinder block 132 and the crankcase member 144 define an opening 168. A flywheel magneto or generator 170 is formed on a forward portion of the crankshaft 120 to extend forwardly through the opening 168. The flywheel magneto 170 generates electric power supplied to electric equipment of the engine 74. The magneto 170 comprises a rotor 172 affixed to a forward end of the crankshaft 120. The rotor 172 is configured in a cup-like shape and a plurality of magnets 174 are affixed onto an internal side surface thereof. A flywheel magneto housing member 176 is affixed to the cylinder block 132 and the crankcase member 144 to close the opening 168. A plurality of posts 178 extend rearwardly toward the rotor 172 from the magneto housing member 176. A plurality of stator coils 180 are affixed to the posts 178 with one coil allotted to each post to face the respective magnets 174 with a small gap. The rotor 172 rotates with the crankshaft 120, while the stator coils 180 remain stationary relative to the rotor 172. The coils 180 thus generate the electric power. The magneto housing member 176 defines a flywheel magneto chamber 181 with forward portions of the cylinder block 132 and the crankcase member 144.

With reference back to FIG. 4, four engine mounts 184 extend from both sides of the crankcase member 144. The engine mounts 184 preferably include resilient portions made of, for example, a rubber material. The engine body 150 is mounted on the lower hull section 66 (or possibly on a hull liner) by the engine mounts 184 so that vibration of the engine body 150 is inhibited from conducting to the hull section 66.

Figure 6:
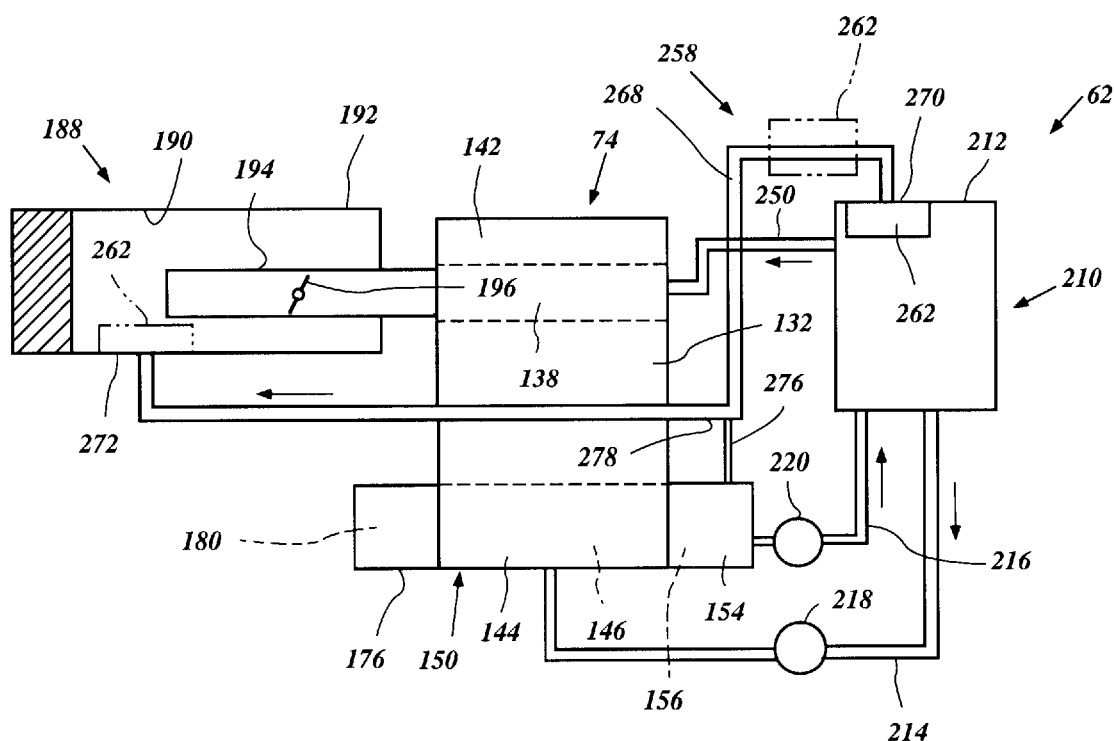
FIG. 6 is a schematic view of a combined lubrication and ventilation system configured in accordance to an embodiment of the present invention.

With reference still to FIG. 4 and additionally to FIG. 6, the engine 74 preferably comprises an air induction system 188 to introduce air to the combustion chambers 140. A plenum chamber 190 is defined with a plenum chamber member 192 disposed atop of the engine body 150. The plenum chamber member 192 is affixed to the engine body 150 by appropriate fasteners such as, for example, bolts. The plenum chamber member 192 has an air inlet opening at a bottom surface thereof and ambient air within the engine compartment 70 can thus flow into the plenum chamber 190. The plenum chamber 190 coordinates or smoothes the air, removes alien substances including water with a filter provided therein, and/or reduces intake noise.

Intake conduits and a portion of the cylinder head member 138 together define intake passages 194 (FIG. 6) that couples the plenum chamber 190 with the respective combustion chambers 140. The intake passages 194 communicate with the combustion chambers 140 through one or more intake ports. A throttle valve 196 preferably is provided in each intake passage 194 for pivotal movement to regulate or measure an amount of air passing through the intake passages 194. Normally, the greater the opening degree of the throttle valves 196, the higher the rate of airflow and higher the engine speed.

The engine 74 preferably comprises an indirect or port injected fuel supply system. The fuel supply system includes four fuel injectors (not shown); one injector allotted to each intake passage 194. The fuel injectors are affixed to a fuel rail that preferably is supported by the intake passages 194. The fuel injectors have injection nozzles opening downstream of the throttle valves 196. The fuel injectors spray fuel through the nozzles in accordance with injection timing and duration under control of an electronic control unit (ECU) (not shown). The sprayed fuel is drawn into the combustion chambers 140 together with the air to form an air/fuel charge therein. A direct fuel injection system that sprays fuel directly into the combustion chambers 140 can replace the indirect fuel injection system described above. Moreover, other charge forming devices such as, for example, carburetors can be used instead of the fuel injection system.

The engine 74 also includes a firing or ignition system. The firing system includes four spark plugs; one spark plug allotted to each combustion chamber 140. The spark plugs are affixed to the cylinder head member 138 so that electrodes, which are defined at ends of the plugs, are exposed to the respective combustion chambers 140. The spark plugs fire the air/fuel charge in the combustion chambers 140 in accordance ignition timing under control of the ECU. The air/fuel charge thus is burned within the combustion chambers 140 to move the pistons 136 generally downwardly.

The engine 74 also includes an exhaust system configured to discharge burnt charges, i.e., exhaust gases, from the combustion chambers 140 to a location outside of the watercraft 60. The exhaust system includes exhaust passages defined by a portion of the cylinder head member 138 and exhaust conduits 200 extending generally around the engine body 150 and then rearwardly. The exhaust passages communicate with the associated combustion chambers 140 through one or more exhaust ports. The exhaust passages also communicate with an exhaust silencer 202 disposed between two of the exhaust conduits 200 positioned downstream. Exhaust noise is reduced within the exhaust silencer 202. An additional exhaust conduit (not shown) extends from the exhaust silencer 202 laterally across the center plane CP and then rearwardly toward the tunnel 112. A discharge opening is formed on an inner surface of the tunnel 112 and the last exhaust conduit is connected to the discharge opening. The exhaust gases thus are discharged to the body of water through the discharge opening of the tunnel 112.

The engine 74 further comprises other components which are provided for typical four-cycle engines. For instance, a valve mechanism including, for example, intake and exhaust valves, a valve actuator mechanism including, for example, one or more camshafts, and a valve actuator drive mechanism including, for example, sprockets and a timing chain or belt are provided.

With reference to FIG. 5, the illustrated engine body 150 defines a drive mechanism chamber 206 in which the valve actuator drive mechanism is disposed between the crankcase chamber 146 and the gear chamber 156. This valve actuator drive mechanism is driven by the crankshaft 120. FIG. 5 shows a drive sprocket 208 disposed on the crankshaft 120 and a portion of a timing chain or belt wound around the drive sprocket 208 in phantom. Because the foregoing mechanisms are well known to persons skilled in the art, no further description are deemed to be necessary.

In operation,. ambient air enters the engine compartment 70 defined in the hull 64 through the air ducts 106. The air is introduced into the plenum chamber 190 defined by the plenum chamber member 192 and then drawn into the intake passages 194. The throttle valves 196 in the intake passages 194 regulate an amount of the air toward the combustion chambers 140. At the same time, the fuel injectors spray fuel into the intake ports under the control of ECU. Air/fuel charges are thus formed and are delivered to the combustion chambers 140. The air/fuel charges are fired by the spark plugs also under the control of the ECU. The burnt charges, i.e., exhaust gases, are discharged to the body of water surrounding the watercraft 60 through the exhaust system.

With reference to FIGS. 5 and 6, a first embodiment of the combined lubrication and ventilation system 62 will now be described below.

The engine 74 preferably employs a lubrication system that delivers lubricant oil to engine portions that need lubrication for inhibiting frictional wear of such portions. A closed-loop type, dry-sump lubrication system 210 preferably is applied in this embodiment. The lubrication system 210 comprises a lubricant oil tank assembly or oil container 212, a feed passage 214, a scavenge passage 216, a feed pump 218 and a scavenge pump 220.

The oil tank assembly 212 stores lubricant oil for lubricating the engine 74. The oil tank assembly 212 comprises a lower tank body 222 unitarily formed with the intermediate shaft and pump housing 158 and is located thereabove in a rear area of the engine body 150. An upper tank body 224 is affixed to an upper portion of the lower tank body 222. The feed passage 214 couples the oil tank assembly 212 with internal delivery passages or "oil galleries" defined in the engine body 150 which guide lubricating oil to engine portions. The term "engine portions" include portions directly or indirectly relating to engine operations and also includes transmissions such as the gear train 166.

The feed passage 214 can be formed either internally within the engine body 150 and the pump housing 158 or separately from them with conduit members. The feed pump 218 pressurizes the oil in the oil tank assembly 212 and thus moves the oil to the internal delivery passages. The scavenge passage 216 in turn couples the oil tank assembly 212 with a shallow reservoir defined in the flywheel magneto chamber 180, the crankcase chamber 146, the drive mechanism chamber 206 and the gear chamber 166. The scavenge passage 216 also can be formed either internally within the engine body 150 and the pump housing 158 or separately from them with conduit members. The shallow reservoir is a space positioned at respective bottom portions of the chambers 180, 146, 206, 156 and is configured to temporarily collect oil. Each chambers 180, 146, 206, 156 preferably communicate with one another to form a single reservoir space. The oil that has lubricated the engine portions drains downwardly to the shallow reservoir to temporarily collect in this space. The scavenge pump 220 pressurizes the oil in the reservoir space to the oil tank assembly 212.

The feed and scavenge pumps 218, 220 preferably have a common pump shaft and journaled within the intermediate shaft and pump housing 158. The common shaft is positioned aside the intermediate shaft 124 and is provided with the foregoing pump gear engaging with the drive gear 162 in the gear housing 154 as described above. The crankshaft 120 thus drives the feed and scavenge pumps 218, 220. Separate intermediate shaft housing and pump housing of course can be provided to separately incorporate the pumps 218, 220 from the intermediate shaft 124.

A baffle 228 preferably divides the internal cavity of the oil tank assembly 212 into two spaces vertically arranged volumes. The baffle 228 extends horizontally within the lower tank body 222 and is affixed thereto. The baffle 228 preferably has a plurality of apertures or slots therein. A unitary conduit 230 formed with the lower tank body 222 defines a portion of the scavenge passage 216. The unitary conduit 230 extends upwardly within the lower tank body 222 toward the baffle 228. An extension pipe 232 penetrates the baffle 228 to extend further upwardly within the upper tank body 224.

A detour pathway member 234 generally surrounds the extension pipe 232. The detour member 234 comprises an outer plate 236 extending vertically along an inner surface of the oil tank assembly 212, an inner pipe 238 extending along the extension pipe 232 and affixed thereto, and sloping members 240 defining a detour passage 242 between the outer plate 236 and the inner pipe 238. The detour passage 242 is a single pathway and slopes down to the baffle 228 as defined by the sloping members 240 one by one. The sloping members 240 are affixed both the outer plate 236 and the inner pipe 238.

The detour pathway member 234 primarily is provided to remove air or air bubbles from the oil that is scavenged through the scavenge passage 216. This is because the depth of the shallow reservoir allows air and air bubbles to remain entrained within the oil. Air desirably is removed before being fed to the engine portions and the detour pathway member 234 is useful for this purpose. That is, because being lighter than the oil, the air can ascend toward a top portion of the oil tank assembly 212 but the oil descends along the detour passage 242 down to the baffle 228. The air thus can be separated from the oil.

An opening 246 is formed atop of the upper tank body 224. A spillway pipe 248 extends downwardly from the opening 246 into an upper portion of the detour pathway member 234. A flexible spillway conduit 250, which preferably is made of elastic material such as, for example, a rubber material or a soft plastic material, also extends outwardly from the opening 246 to connect the spillway pipe 248 with an internal portion of the cylinder head member 138. In the event that excess oil is in the oil tank assembly 212, such excess oil could spill into the spillway pipe 248 and spillway pipe 248 and thereby move to the internal portion of the cylinder head member 138. The oil then contributes to lubrication of the engine portions therein.

The engine 74 preferably employs a ventilation system 258. As noted above, the ventilation system 258 is combined with the lubrication system 210. During engine operations, blow-by gases are produced with an air/fuel mixture and/or oil leaking from each combustion chamber 140 to the crankcase chamber 146 through a nominal space formed between a piston 136 and an inner surface of a cylinder bore 134. Typically, the ventilation system 258 is a system that separates a gaseous component or vapor from a liquid component and delivers the gaseous component to the air induction system 188 for burning it with a fresh air/fuel charge in the combustion chambers 140. In the illustrated embodiment, the blow-by gases mingles with the oil that has lubricated the engine portions and collects in the shallow space at the bottom of the engine body 150. The scavenge passage 216 including the unitary conduit 230 and the extension pipe 232 delivers the blow-by gases to the oil tank assembly 212 with the oil under pressure of the scavenge pump 220. In addition, the air separated from the oil by the detour pathway member 234 still contains a large quantity of component and drifts within the oil tank assembly 212 as oil mist.

With reference to FIG. 5, a ventilation chamber 262 preferably is formed atop of the upper tank body 212. The ventilation chamber 262 defines a vapor separator having a labyrinth path therein to separate the liquid component of blow-by gases ascending to the ventilation chamber 262 as well as the liquid component of the oil mist. The ventilation chamber 262 can have any labyrinth structures which are conventional. However, even though no labyrinth path is formed, the ventilation chamber 262 can act as a vapor separator if something that alters a flow direction or reduces a flow velocity of the blow-by gases ascending to the ventilation chamber 262 and the oil mist. At least a baffle 264, which is positioned over the top opening of the extension pipe 232, is useful as a vapor separator because the blow-by gases and the oil mist must detour around the baffle 264 before entering the ventilation chamber 262. Having the labyrinth path further aids in removing liquid components from gaseous components. Additionally, the ventilation chamber 262 can have one or more apertures through which the blow-by gases and the oil mist enter the chamber 262 because the apertures can reduce the flow velocity of the blow by gases and the oil mist.

With reference to FIGS. 5 and 6, a ventilation passage 268 defined by a flexible conduit, which preferably is made of elastic material such as, for example, a rubber material or a soft plastic material, extends from the ventilation chamber 262, i.e., from a top portion 270 of the upper tank body 224. With reference to FIGS. 3, 4 and 6, preferably, the ventilation passage 268 extends downwardly and toward a bottom portion 272 of the plenum chamber member 192. The ventilation passage 268 communicates with the plenum chamber 190. As shown in FIGS. 3 and 4, the top portion 270 of the oil tank assembly 212 is positioned on the starboard side, while the bottom portion 272 of the plenum chamber member 192 is positioned on the port side. In other words, the top and bottom portions 270, 272 are located on separate sides from each other relative to the center plane CP.

This arrangement is advantageous when the watercraft 60 capsizes. That is, when capsizing, the oil in the oil tank assembly can flow into the ventilation passage 268. However, by turning the hull 64 in a direction such that the port side half, on which the bottom portion 272 is located, is always higher than the starboard side half, on which the top portion 270 is located, the oil can return to the oil tank assembly 212 without flowing into the plenum chamber 190. This would be a counter-clockwise rotation when viewing the watercraft from the rear. It should be noted that the bottom portion 272 itself is not necessarily positioned on the port side. It is sufficient, to achieve the above-noted effect, for at least a portion of the ventilation passage 268 to extend on the port side.

With reference to FIGS. 3–6, a return passage 276 preferably couples a bottom portion or a lower-most portion 278 of the ventilation passage 268 with inside of the engine body 150, i.e., with the gear chamber 156. The bottom portion or the lower-most portion 278 is positioned higher than an oil level in the oil tank assembly 212 when the watercraft 60 capsizes. Any inside portion of the engine body 150 is available. For instance, the flywheel magneto chamber 180 is one of them as shown in FIG. 4. The crankcase chamber 146 and the drive mechanism chamber 206 of course are applicable. With reference to FIG. 4, a "T-joint" pipe 280, which is generally shaped as the letter T, is conveniently used to connect the return passage 276 with the ventilation passage 268. The return passage 276 is defined by a conduit that preferably is made of elastic material such as, for example, a rubber material or a soft plastic material. The return passage 276 also is advantageous when the watercraft 60 capsizes because oil in the ventilation passage 268 can promptly move to inside of the engine body 150 by turning the hull 64 of the watercraft 60.

In operation, with reference to FIGS. 5 and 6, the oil containing the blow-by gases and air existing in the shallow reservoir of the engine body 150 are delivered to the oil tank assembly 212 through the scavenge passage 216 that includes the unitary conduit 230 and the extension pipe 232 by the scavenge pump 220. The oil then spills from the top of the extension pipe 232 and flows down to the detour passage 242 of the detour pathway member 234. While moving down to the baffle 228 through the detour passage 242, the air in the oil is separated from the oil and ascends to the ventilation chamber 262. The oil descends to the baffle 228 and then goes through the apertures or slots of the buffer 228 to accumulate within the lower tank body 222. The oil accumulating in the lower tank body 222 is pressurized by the feed pump 218 and is thereby moved toward the engine portions through the feed passage 214. The oil lubricates the engine portions and then drains downwardly to the shallow space in the engine body 150 by its own weight. The blow-by gases also collect in the shallow reservoir. The oil containing air and the blow-by gases are again sent back to the oil tank assembly 212 through the scavenge passage 216. This cycle repeats inasmuch as the engine 62 operates.

Additionally, oil mist drifting in the oil tank assembly 212 is drawn to the ventilation chamber 262 to be separated thereby. The separated gaseous component or vapor travels through the ventilation passage 268 to the plenum chamber 190. The gaseous component then is mixed with a fresh air/fuel charge within the intake passages 196 and is burned in the combustion chambers 140 with the air/fuel charge.

In the event such that the watercraft 60 capsizes and the hull 64 is in an up-side down position, the oil in the oil tank assembly 212 can leak to the ventilation passage 268. When, however, the hull 64 is rotated counter-clockwise (when the watercraft is viewed from the rear) to the normal upright position, the oil in the ventilation passage 268 flows to inside of the engine body 150 through the return passage 276. In addition, by turning the hull 64 in a direction such that the port side half is always higher than the starboard side half (counter-clockwise), the oil can return to the oil tank assembly 212 without flowing into the plenum chamber 190.

The ventilation chamber 262 can be located, additionally or solely within the oil tank assembly 212, in the ventilation passage 268 and/or in the plenum chamber member 192 as shown in FIG. 6.

Figure 7:
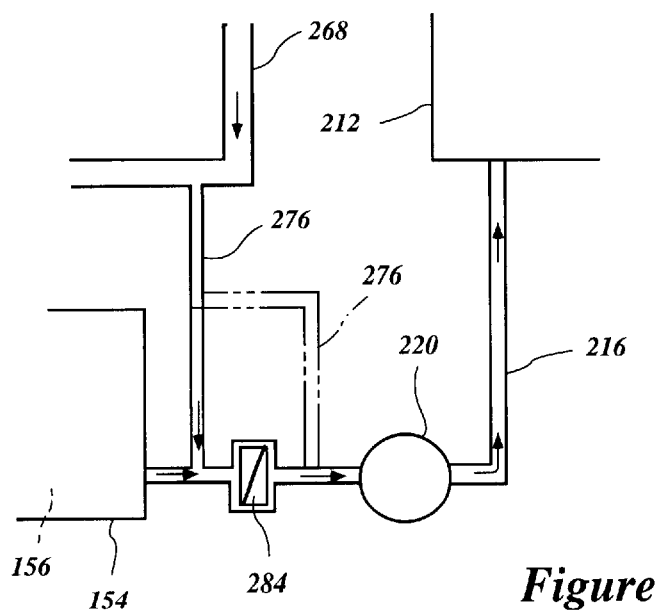
FIG. 7 is a partially enlarged schematic view showing a modification of the embodiment illustrated in FIG. 6.

FIG. 7 illustrates a modification of the arrangement shown in FIG. 6. In FIG. 7, the return passage 276 is connected with the scavenge passage 216 in this alternative arrangement. An oil filter 284 is disposed upstream or downstream of a location where the return passage 276 is connected. Because alien substances are removed by the filter 284 before returning to the oil tank assembly 212, the oil in the oil tank assembly 212 is less likely to have such alien substances entrained therein.

Figure 8:
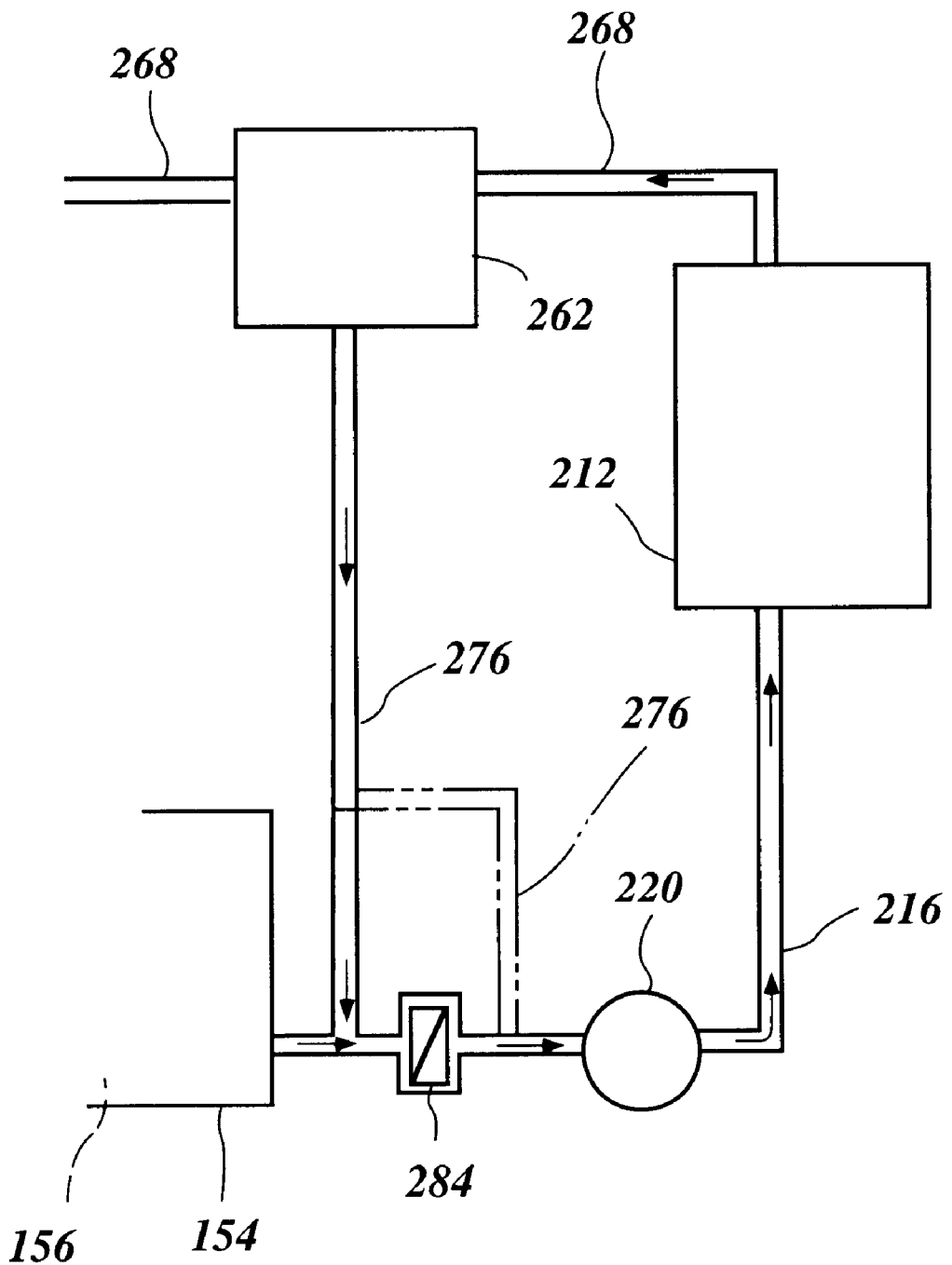
FIG. 8 is a partially enlarged schematic view showing another modification of the embodiment illustrated in FIG. 6.

FIG. 8 illustrates another modification of the arrangement shown in FIG. 6. In FIG. 8, the ventilation chamber 262 is disposed along the ventilation passage 268. The return passage 276 is connected directly to the ventilation chamber 262 and extends from a bottom thereof. The ventilation chamber 262 has a labyrinth path therein.

FIG. 9 illustrates yet another modification of the arrangement shown in FIG. 6. The same members, components and systems already described above will be assigned with the same reference numerals and will not be repeatedly described. Other modifications described hereunder are also assigned with the same reference numerals inasmuch as being provided with the same members, components and systems.

In FIG. 9, the ventilation chamber 262 in this embodiment preferably is disposed within the cylinder head cover member 142. The ventilation chamber 262 communicates with the shallow reservoir space by an appropriate passage (not shown) extending within the engine body 150. The oil tank assembly 212 can still have the detour pathway member 234. A gaseous component separated in the oil tank assembly 212 moves through the spillway passage 250 to inside of the cylinder head cover member 142 to merge with the gaseous component separated by the ventilation chamber 262. The ventilation passage 268 preferably extends from the ventilation chamber 262 to the bottom of the plenum chamber member 192 to communicate with the plenum chamber 190.

A portion of the cylinder head cover member 142 from which the ventilation passage 268 extends preferably is located on one side, for example, the starboard side, and at least a portion of the ventilation passage 268 extends on the other side, for example, the port side. The portion of the plenum chamber member 192 where the ventilation passage 268 is connected can be located on the other side, i.e., the port side. The return passage 276 in this embodiment is connected with the flywheel magneto chamber 180. Otherwise, the return passage 276 can be connected with the crankcase chamber 146.

The separated gaseous components in this arrangement also are delivered to the combustion chambers 140 through the ventilation passage 268, the plenum chamber 190 and the intake passage 194 and are burned in the combustion chambers 140 with a fresh air/fuel charge. Similarly to the first embodiment, the oil flowing into the ventilation passage 268 from the engine body 150 when the watercraft 60 capsizes can return to the engine body 150 through the return passage 276 or to the cylinder head cover member 142 after returning to the normal upright position.

Alternatively, the ventilation chamber 262 can be disposed in the crankcase chamber 146. In this alternative, no internal passage is necessary in the engine body 150 for delivering the blow-by gases and oil mist in the crankcase chamber 146 to the cylinder head cover member 142. The ventilation passage in this alternative extends from the crankcase chamber 146.

FIG. 10 illustrates a further modification of the combined lubrication and ventilation system 62 illustrated in FIG. 6. In this arrangement, the ventilation passage 268 extends from the oil tank assembly 212 and is connected to a top portion of the plenum chamber member 192 to communicate with the plenum chamber 190. The ventilation passage 268 of course can be connected to a bottom portion of the plenum chamber member 192. Instead providing the return passage, a check valve 300 is provided within the ventilation passage 268. The check valve 300 allows the gaseous component to move to the plenum chamber 190 when the watercraft 60 is in the normal upright position, and inhibits the oil in the oil tank assembly 212 from moving to the plenum chamber 190 when the watercraft 60 is in the capsizing position.

Various structures that are mechanically or electrically operated can be applied as actual constructions of the check valve 60. For instance, FIG. 11 illustrates an exemplary structure of the check valve 300. The illustrated check valve 300 has a valve housing 301 which is formed as a tubular shape having an upper narrow part 302 and a lower narrow part 304 to form a valve chamber 306 therebetween. The upper narrow part 302 forms a contiguous wall, while the lower narrow part 304 also forms a wall and includes several slits 308 on its wall portion. A valve ball 310 is moveably disposed in the valve chamber 306. The valve ball 310 has an outer diameter smaller than an inner diameter of the valve chamber 306 but greater than each inner diameter of the upper and lower narrow parts 302, 304.

Constructed as such, while the watercraft 60 is in the normal upright position, the valve ball 310 is rests above on the lower narrow part 304 under its own weight. The gaseous component can ascend through the slits 308, around the valve ball 310, into the valve chamber 306, and further to an upper portion of the ventilation passage 268. In the event as such that the watercraft 60 capsizes, the valve ball 310 contacts the upper narrow part 302, which now is positioned lower than the lower narrow part 304, to completely close the upper narrow part 302. Under this condition, the oil in the oil tank assembly 212 can flow into the check valve housing 301 but is prevented from going further by the valve ball 310 closing the upper narrow part 302. Accordingly, the ventilation system 258 can work when the watercraft is upright and can inhibit the oil from moving to the plenum chamber 190 when capsized.

Figure 12:
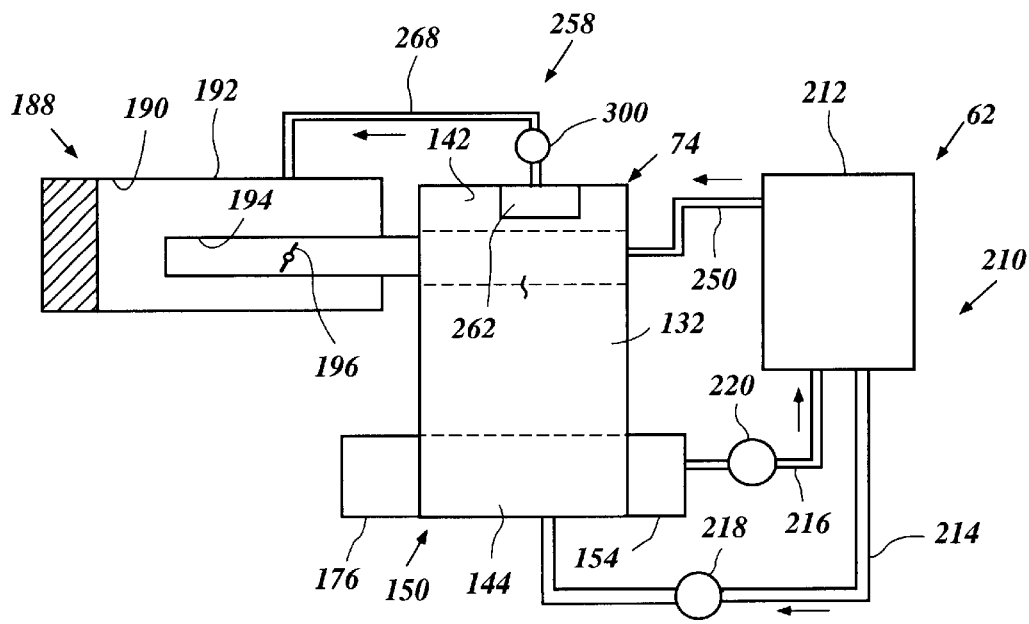
FIG. 12 is a schematic view of a further modification of the combined lubrication and ventilation system illustrated in FIG. 6.

FIG. 12 illustrates yet another modification of the combined lubrication and ventilation system 62 illustrated in FIG. 6. In this arrangement, the ventilation passage 268 extends from the cylinder head cover member 142 where the ventilation chamber 262 is located similarly to the arrangement shown in FIG. 9. The same check valve 300 used for the third embodiment and is shown in FIG. 11 also is applied for this embodiment and is disposed within the ventilation passage 268.

Figure 13:
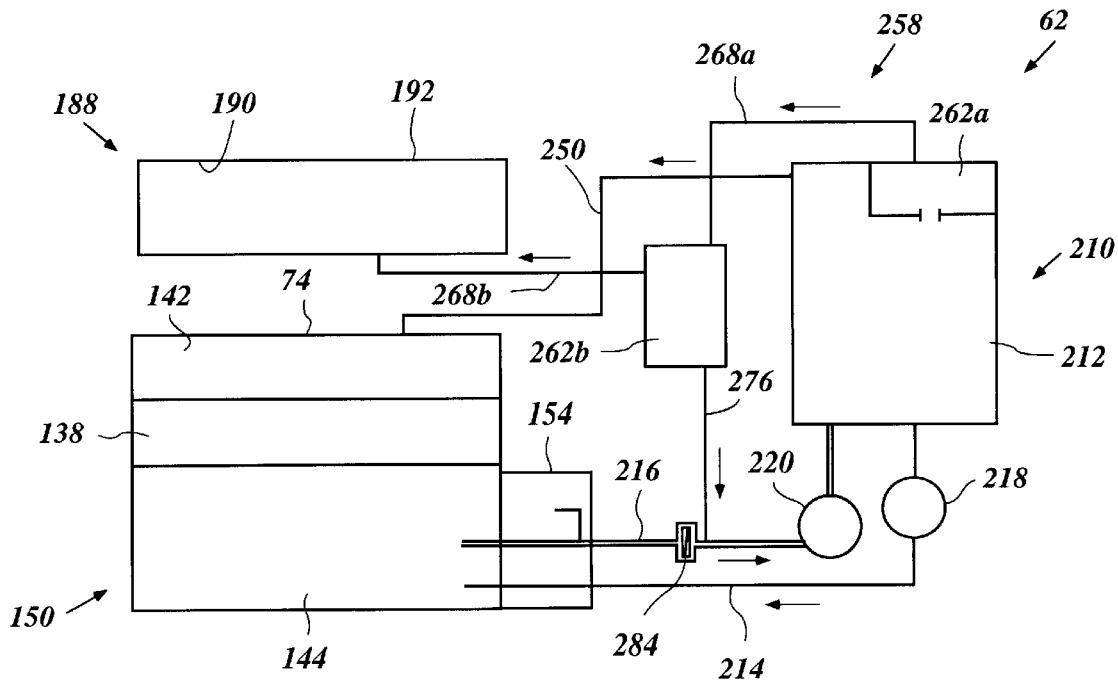
FIG. 13 is a schematic view of yet a further modification of the combined lubrication and ventilation system illustrated in FIG. 6.

FIG. 13 illustrates yet another modification of the combined lubrication and ventilation system 62 illustrated in FIG. 6. In this arrangement, a first ventilation chamber 262a is disposed atop of the oil tank assembly 212, while a second ventilation chamber 262b is disposed separately either from the oil tank assembly 212 or the cylinder head cover member 142. Both the first and second ventilation chambers 262a, 262b form labyrinth paths therein. The ventilation passage 268 comprises an upstream portion 268a that connects the first ventilation chamber 262a to a top portion of the second ventilation chamber 262b and a downstream portion 268b that connects the second ventilation chamber 262b to the bottom portion of the plenum chamber 190. The return passage 276 connects a lower end portion of the second ventilation chamber 262b to the scavenge passage 216, preferably downstream of the oil filter 284.

Figure 14:
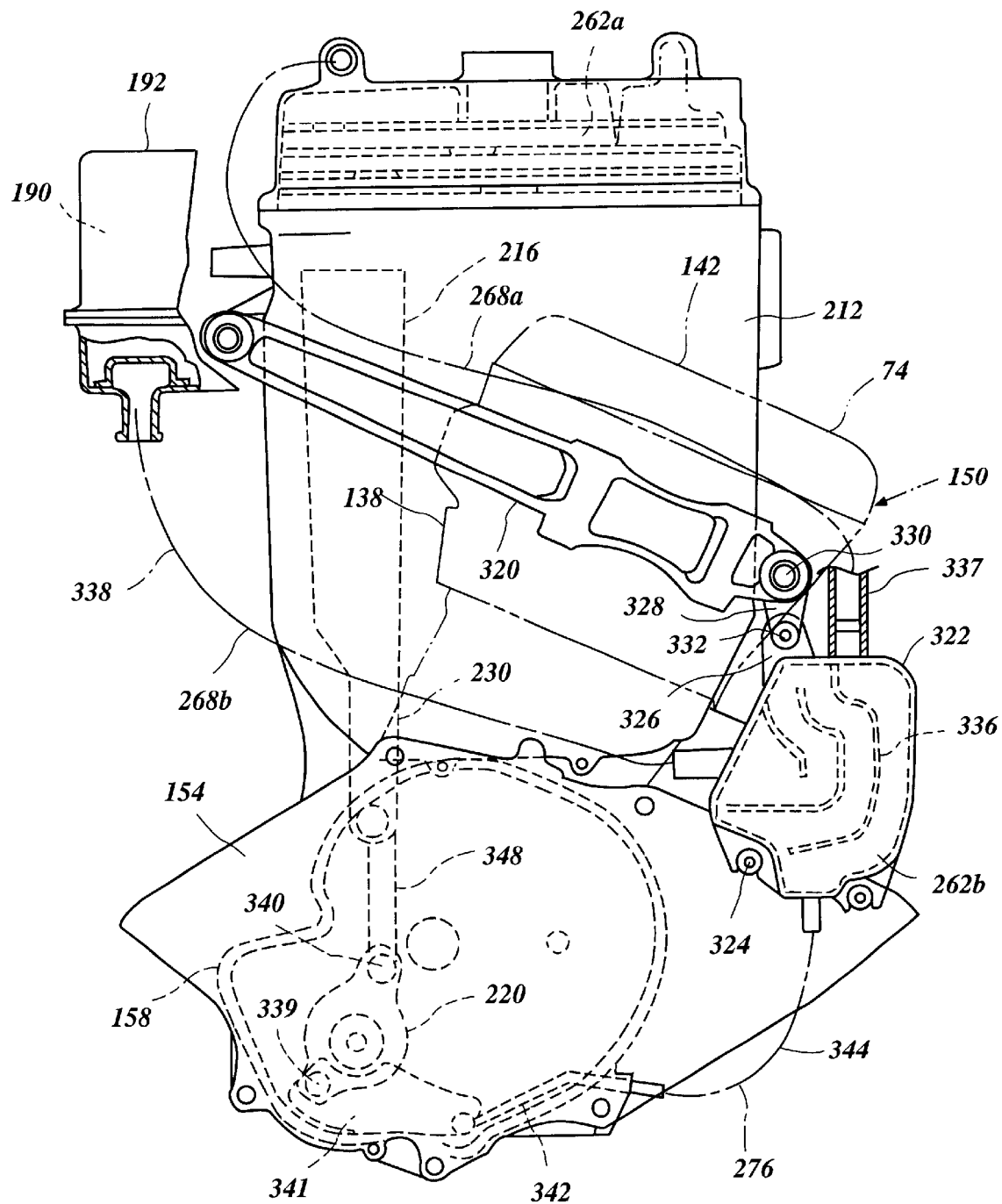
FIG. 14 is a rear elevational and partial cross-sectional view of a modification of the engine illustrated in FIG. 4.

FIG. 14 illustrates a modification of the arrangement shown in FIG. 13. An oil tank bracket 320 extending from the engine body 150 supports the oil tank assembly 212 to the rear thereof. A separate ventilation chamber member 322 is mounted on the gear housing 154 by bolts 324 at lower-portions of the ventilation chamber member 322. A stay 326 extends generally upwardly from a top portion of the ventilation chamber member 322, while another stay 328 affixed to the oil tank bracket 320 with a bolt 330 extends generally downwardly from a lower portion of the tank bracket 320. Both the stays 326, 328 are coupled together by a bolt 332 to support the upper portion of the ventilation chamber member 322.

The separate ventilation chamber member 322 defines the second ventilation chamber 262b wherein a labyrinth path 336 is formed. A flexible conduit 337 defining the upstream portion 268a of the ventilation passage 268 couples the second ventilation chamber 262b with the first ventilation chamber 262a formed in the oil tank assembly 212. On the other hand, another flexible conduit 338 defining the downstream portion 268b of the ventilation passage 268 couples the second ventilation chamber 262b with the plenum chamber 190. An oil tank portion where the upstream portion 268a is connected is located on one side of the watercraft 60, e.g., the starboard side, and at least a portion of the upstream ventilation passage 268a is located on the other side, e.g., the port side.

The scavenge pump 220 disposed within the pump housing 158 located next to the gear housing 154 has an inlet port 339 and an outlet port 340. The inlet port 339 opens in a scavenge oil chamber 341 formed within the pump housing 158 and communicating with a portion of the shallow reservoir formed within the gear housing 154. The scavenge oil chamber 341 also is connected to the lower end portion of the second ventilation chamber 262b defined within the ventilation chamber member 322 through the return passage 276 formed with an internal passage 342 and a flexible outer conduit 344. A vertical passage 348 extending generally vertically couples the outlet port 340 with the unitary conduit 230 formed in the oil tank assembly 212. The first and second ventilation chambers 262a, 262b thus are connected in series with each other and the blow-by gases an the oil mist move at first through the first ventilation chamber 262a and then go through the second ventilation chamber 262b.

Constructed as such, while the watercraft 60 is in the normal upright position, the blow-by gases and the oil mist in this arrangement move to the plenum chamber 190 from the oil tank assembly 212, having passed through two liquid-vapor separation devices. The liquid component separated by the first ventilation chamber 262a falls down to the oil in the oil tank assembly 212 by its own weight. The liquid component separated by the second ventilation chamber 262b in turn moves to the scavenge passage 216 and then is delivered to the oil tank assembly 212 by the scavenge pump 220. In the event as such that the watercraft 60 capsizes, the oil in the oil tank assembly 212 can flow out to the ventilation passage. The oil, however, can return to the scavenge passage 216 through the return passage 276 or to the oil tank assembly 212.

Figure 15:
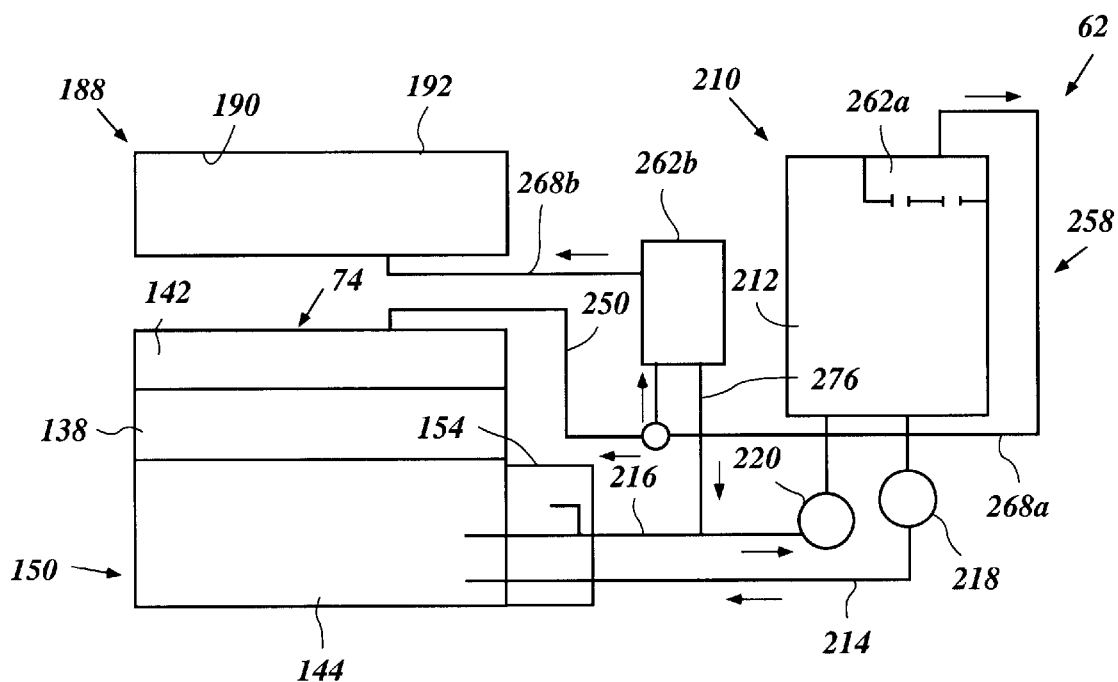
FIG. 15 is a schematic view of a combined lubrication and ventilation system of the engine illustrated in FIG. 14.

FIG. 15 illustrates a further modification of the combined lubrication and ventilation system 62 illustrated in FIG. 13. In this arrangement, the upstream portion 268a of the ventilation passage extends generally below the oil tank assembly 212 to the second ventilation chamber 262b. The illustrated upstream portion 268a also serves as a portion of the spillway passage 250.

Figure 16:
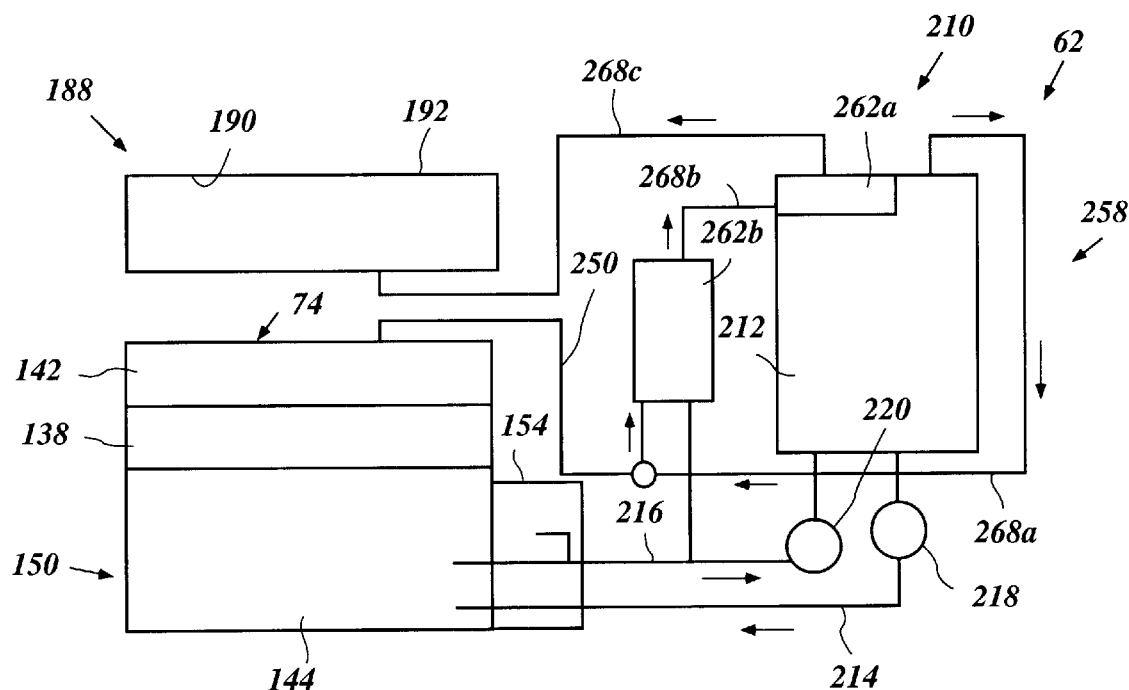
FIG. 16 is a schematic view of a modification of the combined lubrication and ventilation system illustrated in FIG. 15.

FIG. 16 illustrates another modification of the combined lubrication and ventilation system 62 illustrated in FIG. 13. The upstream portion 268a of the ventilation passage in this embodiment does not extend from the first ventilation chamber 262a and is connected to the second ventilation chamber 262b. An intermediate portion 268b connects the second ventilation chamber 262b to the first ventilation chamber 262a disposed in the oil tank assembly 212. A downstream portion 268c then connects the first ventilation chamber 262a with the plenum chamber 190. Accordingly, the blow-by gases thus moves at first through the second ventilation chamber 262b and then goes through the first ventilation chamber 262a in this embodiment.

Figure 17:
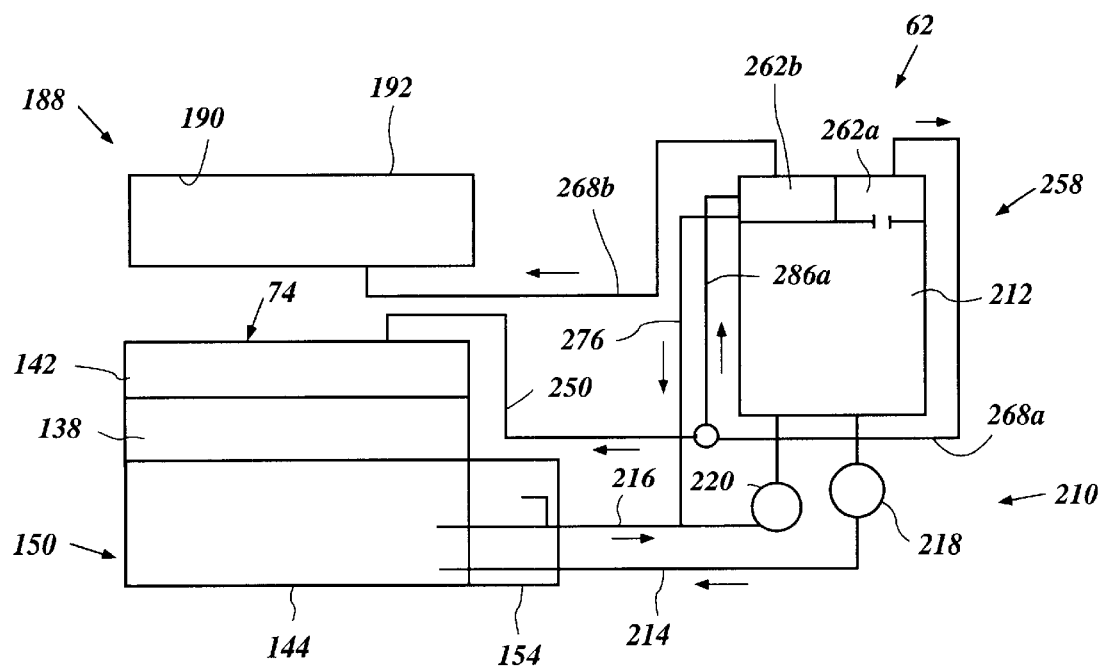
FIG. 17 is a schematic view of another modification of the combined lubrication and ventilation system illustrated in FIG. 15.

FIG. 17 illustrates another modification of the combined lubrication and ventilation system 62 illustrated in FIG. 13. The illustrated oil tank assembly 212 incorporates the first and second ventilation chambers 262a, 262b juxtaposing with each other atop of the oil tank assembly 212. An upstream portion 268a of the ventilation passage extending downwardly and upwardly around the oil tank assembly 212 to connect the first ventilation chamber 262a to the second ventilation chamber 262b. A downstream portion 262b connects the second ventilation chamber 262b to the plenum chamber 192. The return passage 276 extends from the second ventilation chamber 262b in the oil tank assembly 212 to the scavenge passage 216.

Of course, the foregoing description is that of a preferred construction having certain features, aspects and advantages in accordance with the present invention. Various changes and modifications may be made to the above-described arrangements without departing from the spirit and scope of the invention, as defined by the appended claims.

What is claimed is:

1. A watercraft comprising a hull, a propulsion device configured to propel the hull, an internal combustion engine arranged to power the propulsion device, the engine including an engine body and a moveable member moveable relative to the engine body, the engine body and the moveable member together defining a combustion chamber, an air induction system arranged to guide air to the combustion chamber, a lubrication system arranged to lubricate at least a portion of the engine body with lubricant oil, the lubrication system including an oil container exterior to the engine body, and a ventilation system including a separator configured to separate a gaseous component from a liquid component, a ventilation passage connecting the separator with the air induction system, and a return passage coupling a bottom portion of the ventilation passage to an interior of the engine body.

2. The watercraft as set forth in claim 1, wherein the engine body defines a space configured to temporarily collect oil that has lubricated the portion of the engine body.

3. The watercraft as set forth in claim 2, wherein the lubrication system includes a scavenge passage coupling the space with the oil container, and the return passage is connected to the scavenge passage.

4. The watercraft as set forth in claim 3, wherein the lubrication system includes a scavenge pump communicating with the scavenge passage, the scavenge pump being configured to transfer the oil in the space to the oil container.

5. The watercraft as set forth in claim 2, wherein the engine includes an output shaft coupled with the moveable member for rotation, the propulsion device includes a propulsion shaft, the engine body defines a gear chamber in which a gear train connecting the output shaft with the propulsion shaft is disposed, the space at least in part is defined in the gear chamber, and the return passage is connected to the space in the gear chamber.

6. The watercraft as set forth in claim 2, wherein the engine includes an output shaft coupled with the moveable member for rotation, and an engine component driven by the output shaft, the engine body defines a component chamber in which the engine component is disposed, the space at least in part is defined in the component chamber, and the return passage is connected to the space in the component chamber.

7. The watercraft as set forth in claim 6, wherein the engine component is a generator.

8. The watercraft as set forth in claim 1, wherein the separator is disposed within the oil container.

9. The watercraft as set forth in claim 1, wherein an upstream end of the ventilation passage is disposed on one side of the hull, and at least a portion of the ventilation passage is disposed on the other side of the hull.

10. The watercraft as set forth in claim 1, wherein the bottom portion of the ventilation system is positioned higher than an oil level in the oil container when the watercraft capsizes.

11. A watercraft comprising a hull, a propulsion device configured to propel the hull, an internal combustion engine configured to power the propulsion device, the engine including an engine body and a moveable member moveable relative to the engine body, the engine body and the moveable member together defining a combustion chamber, an air induction system arranged to guide air to the combustion chamber, a lubrication system configured to lubricate at least a portion of the engine body with lubricant oil, the lubrication system including an oil container out of the engine body, and a ventilation system including a separator configured to separate a gaseous component from a liquid component, and a ventilation passage connecting the separator with the air induction system, an upstream end of the ventilation passage being disposed on one side of the hull, and at least a portion of the ventilation passage being disposed on the other side of the hull.

12. The watercraft as set forth in claim 11, wherein a downstream end of the ventilation passage is disposed on the other side of the hull.

13. The watercraft as set forth in claim 11, wherein the engine body defines a space configured to collect temporarily oil that has lubricated the portion of the engine body.

14. The watercraft as set forth in claim 13, wherein the ventilation system includes a return passage coupling a bottom portion of the ventilation passage with the space, the lubrication system includes a scavenge passage coupling the space with the oil container, and the return passage is connected to the scavenge passage.

15. The watercraft as set forth in claim 11, wherein a bottom portion of the ventilation system is positioned higher than an oil level in the oil container when the watercraft capsizes.

16. The watercraft as set forth in claim 11, wherein the separator is disposed within the oil container.

17. The watercraft as set forth in claim 11, wherein the sides are generally separated by a longitudinal plane extending generally vertically and from fore to aft of the watercraft.

18. A watercraft comprising a hull, a propulsion device configured to propel the hull, an internal combustion engine configured to power the propulsion device, the engine including an engine body and a moveable member moveable relative to the engine body, the engine body and the moveable member together defining a combustion chamber, an air induction system configured to guide air to the combustion chamber, a lubrication system configured to lubricate at least a portion of the engine body with lubricant oil, the lubrication system including an oil container exterior to the engine body, and a ventilation system including a separator configured to separate a gaseous component from a liquid component, a ventilation passage connecting the separator with the air induction system, and a check valve disposed within the ventilation passage, the check valve being configured to open when the watercraft is in a normal upright position and to close when the watercraft is in a capsized position.

19. The watercraft as set forth in claim 18, wherein the check valve allows the gaseous component to move from the separator toward the air induction system when the check valve is open.

20. The watercraft as set forth in claim 18, wherein the separator is disposed within the oil container, the check valve being configured to inhibit the oil in the oil container from moving toward the air induction system from the separator.

21. The watercraft as set forth in claim 18, wherein the engine body defines a space configured to collect temporarily oil that has lubricated the portion of the engine body.

22. A watercraft comprising a hull, a propulsion device configured to propel the hull, an internal combustion engine configured to power the propulsion device, the engine including an engine body and a moveable member moveable relative to the engine body, the engine body and the moveable member together defining a combustion chamber, an air induction system configured to guide air to the combustion chamber, a lubrication system configured to lubricate at least a portion of the engine body with lubricant oil, the engine body defining a space configured to temporarily collect oil that has lubricated the portion of the engine body, the lubrication system including an oil container exterior to the engine body, and a scavenge passage connecting the space with the oil container, and a ventilation system including a separator configured to separate a gaseous component from a liquid component, a ventilation passage connecting the separator with the air induction system, and a return passage coupling the ventilation passage with inside of the engine body, the return passage being connected with the scavenge passage.

23. The watercraft as set forth in claim 22, wherein the lubrication system includes a scavenge pump disposed in the scavenge passage, the scavenge pump being configured to pressurize the oil in the space to the oil container.

24. The watercraft as set forth in claim 23, wherein the return passage is connected to the scavenge passage upstream of the scavenge pump.

25. The watercraft as set forth in claim 24, wherein the lubrication system includes an oil filter disposed between the scavenge pump and a location where the return passage is connected.

26. The watercraft as set forth in claim 22, wherein the lubrication system includes an oil filter disposed between the space and a location where the return passage is connected.

27. The watercraft as set forth in claim 22 wherein the lubrication system includes a feed passage connecting the oil container with the portion of the engine body.

28. The watercraft as set forth in claim 27, wherein the lubrication system includes a feed pump disposed in the feed passage, and the feed pump pressurizes the oil in the oil container to the portion of the engine body.

29. The watercraft as set forth in claim 22, wherein the separator is disposed within the oil container.

30. A watercraft comprising a hull, a propulsion device configured to propel the hull, an internal combustion engine configured to power the propulsion device, the engine including an engine body and a moveable member moveable relative to the engine body, the engine body and the moveable member together defining a combustion chamber, an air induction system configured to guide air to the combustion chamber, a lubrication system configured to lubricate at least a portion of the engine body with lubricant oil, the lubrication system including an oil container exterior to the engine body, and a ventilation system including a plurality of separators configured to separate a gaseous component from a liquid component, a ventilation passage connecting the separators with the air induction system, and a return passage coupling the ventilation passage with inside of the engine body.

31. The watercraft as set forth in claim 30, wherein one of the separators is disposed within the oil container.

32. The watercraft as set forth in claim 31, wherein another one of the separators is exterior to the oil container.

33. The watercraft as set forth in claim 30, wherein at least two of the separators are connected in series with each other.

34. The watercraft as set forth in claim 30, wherein one of the separators is disposed within the oil container, another of the separators is disposed exterior to the oil container, both the separators are connected in series with each other, and the separator in the oil container is located upstream than the separator out of the oil container.

35. The watercraft as set forth in claim 30, wherein one of the separators is disposed within the oil container, another one of the separators is disposed exterior to the oil container, both the separators are connected in series with each other, and the separator in the oil container is located downstream than the separator out of the oil container.

36. The watercraft as set forth in claim 30, wherein the separators are disposed within the oil container.

37. The watercraft as set forth in claim 36, wherein the separators are connected in series with each other.

38. A watercraft comprising a hull, a propulsion device configured to propel the hull, an internal combustion engine configured to power the propulsion device, the engine comprising a cylinder block defining a cylinder bore, a piston reciprocally disposed within the cylinder bore, and a cylinder head closing an end of the cylinder bore to define a combustion chamber with the cylinder bore and the piston, an air induction system configured to guide air to the combustion chamber, a lubrication system configured to lubricate at least a portion of the engine with lubricant oil, the lubrication system including an oil container out of the engine, and a ventilation system including a separator configured to separate a gaseous component from a liquid component, the separator being disposed within the cylinder head, a ventilation passage connecting the separator with the air induction system, and a return passage connecting a bottom portion of the ventilation passage with inside of the engine.

39. A watercraft comprising a hull, a propulsion device configured to propel the hull, an internal combustion engine configured to power the propulsion device, the engine comprising a cylinder block defining a cylinder bore, a piston reciprocally disposed within the cylinder bore, and a cylinder head closing an end of the cylinder bore to define a combustion chamber with the cylinder bore and the piston, an air induction system configured to introduce air to the combustion chamber, a lubrication system configured to lubricate at least a portion of the engine with lubricant oil, the lubrication system including an oil container out of the engine, and a ventilation system including a separator configured to separate a gaseous component from a liquid component, the separator being disposed within the cylinder head, and a ventilation passage connecting the separator with the air induction system, an upstream end of the ventilation passage being disposed on one side of the hull, and at least a portion of the ventilation passage being disposed on the other side of the hull.

40. A watercraft comprising a hull, a propulsion device configured to propel the hull, an internal combustion engine configured to power the propulsion device, the engine comprising a cylinder block defining a cylinder bore, a piston reciprocally disposed within the cylinder bore, and a cylinder head closing an end of the cylinder bore to define a combustion chamber with the cylinder bore and the piston, an air induction system configured to introduce air to the combustion chamber, a lubrication system configured to lubricate at least a portion of the engine with lubricant oil, the lubrication system including an oil container exterior to the engine, and a ventilation system including a separator configured to separate a gaseous component from a liquid component, and a ventilation passage connecting the separator with the air induction system, the separator being disposed within the cylinder head, and a check valve disposed within the ventilation passage, the check valve being configured to open when the watercraft is in a normal upright position and to close when the watercraft capsizes.

* * * * *